Feb. 17, 1948.  A. P. WIERTZ  2,436,240
AIRPLANE LANDING GEAR
Filed Oct. 21, 1943  3 Sheets-Sheet 2

Feb. 17, 1948.　　A. P. WIERTZ　　2,436,240
AIRPLANE LANDING GEAR
Filed Oct. 21, 1943　　3 Sheets-Sheet 3

Inventor
A. P. Wiertz
By L. F. Randolph
Attorney

Patented Feb. 17, 1948

2,436,240

UNITED STATES PATENT OFFICE 2,436,240

AIRPLANE LANDING GEAR

Anthony P. Wiertz, Dayton, Ohio

Application October 21, 1943, Serial No. 507,151

5 Claims. (Cl. 244—63)

1

This invention relates to an airplane landing gear or device and it aims to provide a mobile platform or body adapted for the landing and takeoff of aircraft.

It is particularly aimed to provide a structure having cradles adapted to be raised and lowered by hydraulic mechanism.

It is further aimed to provide a structure having front and rear cradles, one or both of which is movable laterally or from side to side to conform to the contour of the engaging surface of the aircraft, and particularly to facilitate engagement with the tail end of the plane which may fishtail right or left or be blown one way or the other by side winds.

The more specific objects and advantages will in part be pointed out and otherwise become apparent from a consideration of the description following taken in connection with accompanying drawings illustrating an operative embodiment.

In said drawings—

Figure 5 is a vertical section taken on the line 5—5 of Figure 2; and

Figure 6 is a detail vertical section taken on the line 6—6 of Figure 2.

Figure 1:
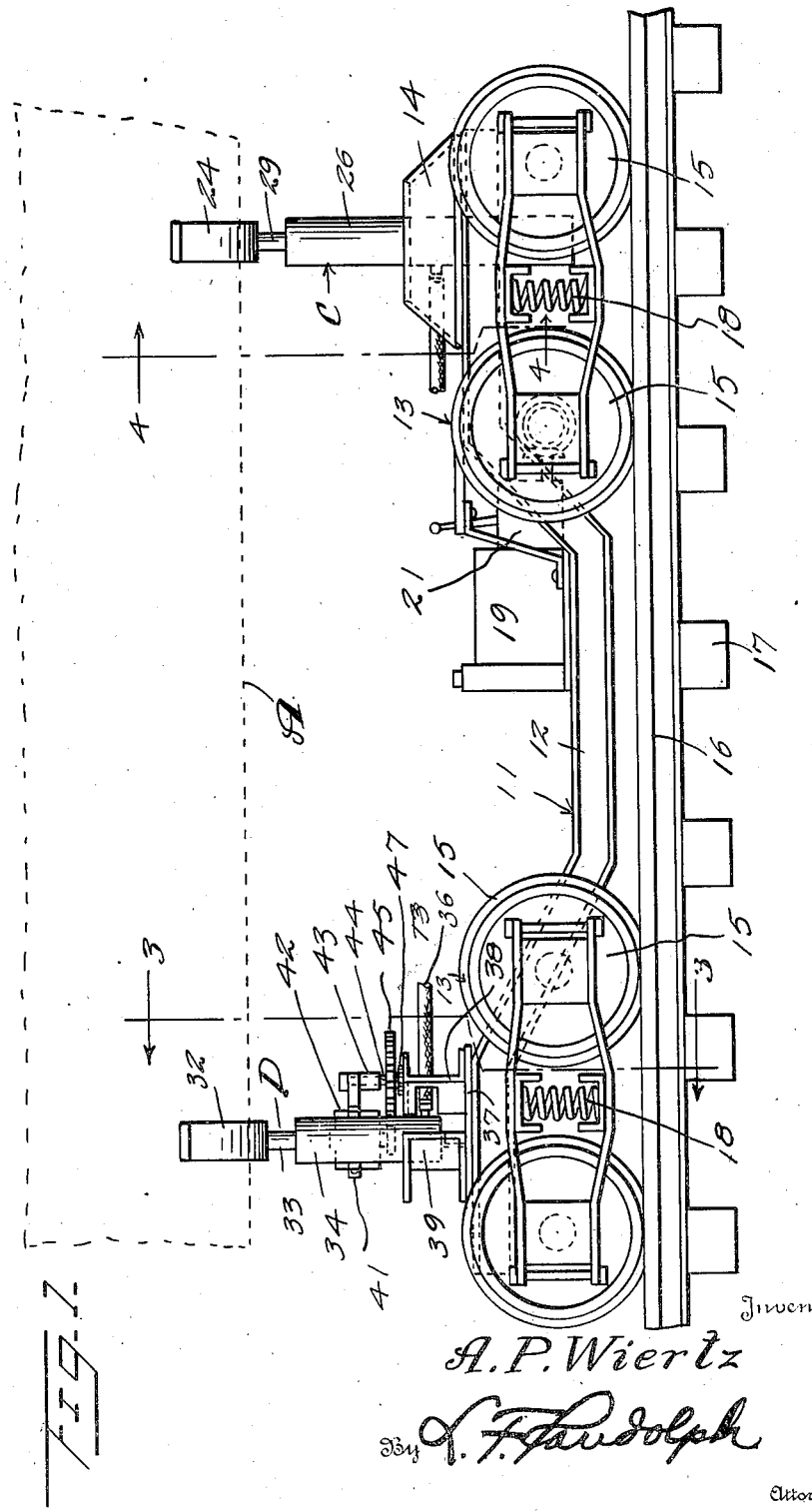
Figure 1 is a view in side elevation showing the improved structure.
Figure 2:
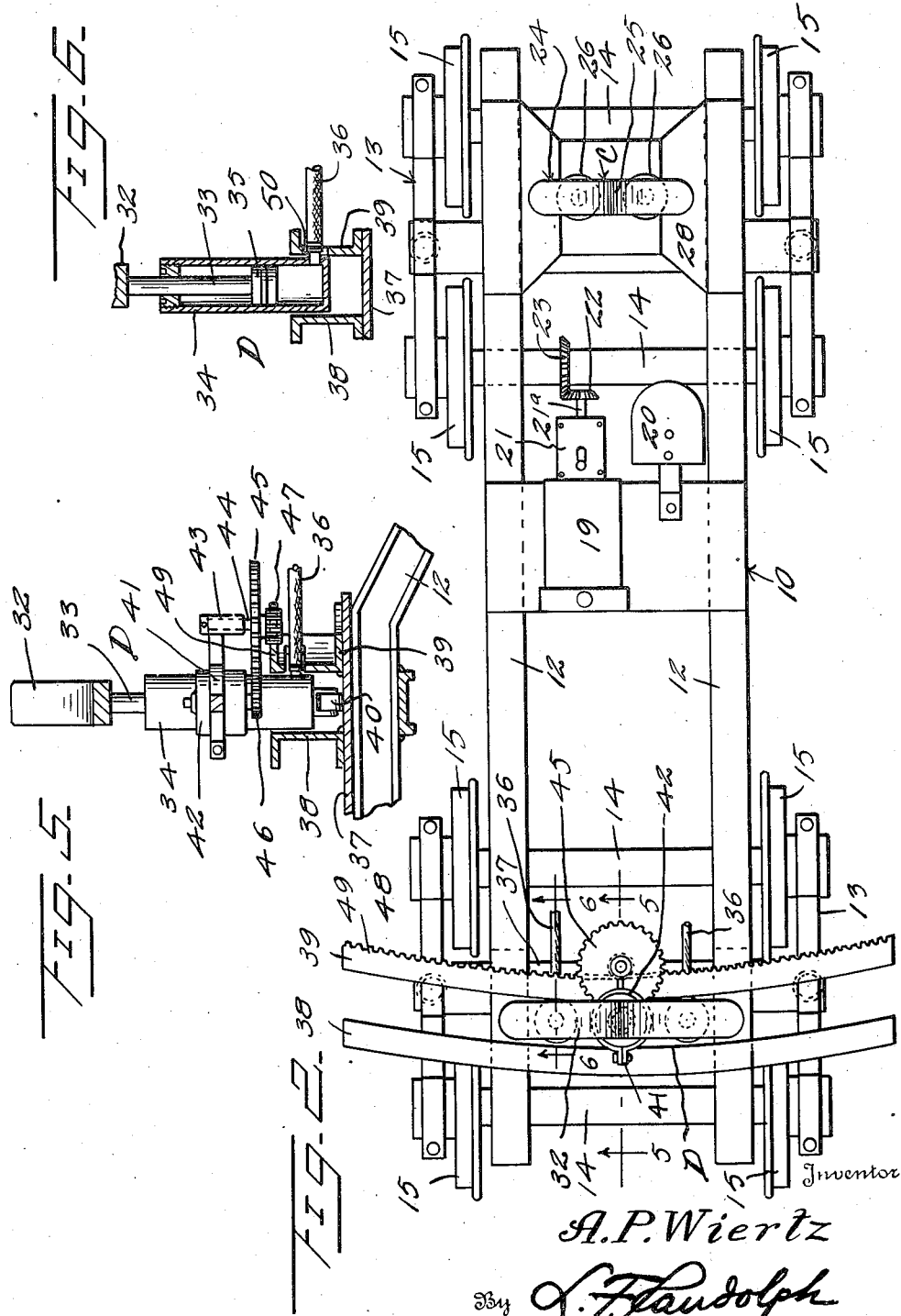
Figure 2 is a plan view.
Figure 3:
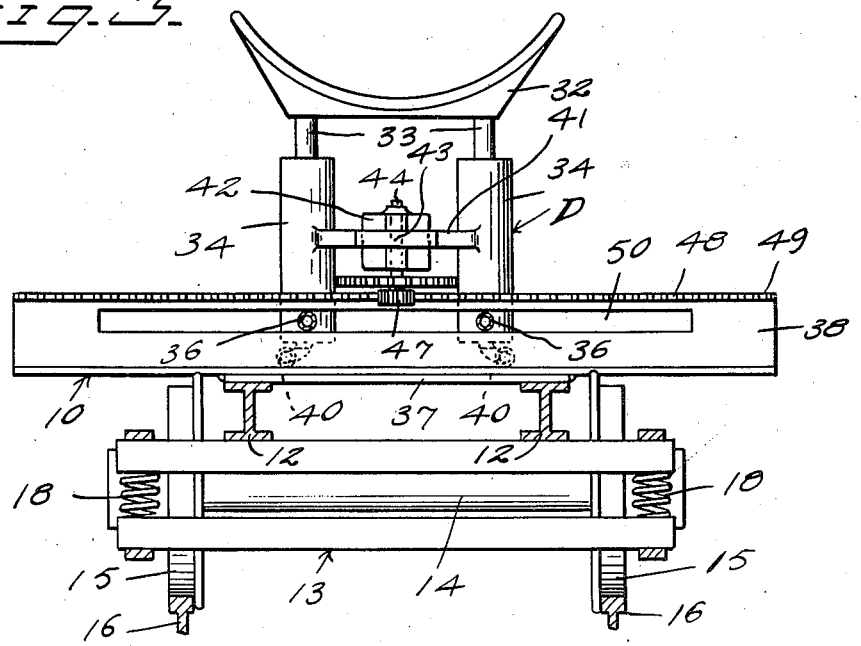
Figure 3 is a vertical section taken on the line 3—3 of Figure 1.
Figure 4:
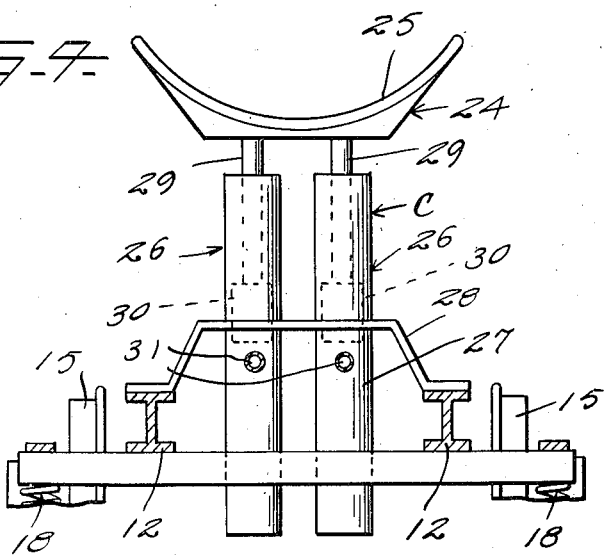
Figure 4 is a vertical section taken on the line 4—4 of Figure 1.

Referring specifically to the drawings wherein like reference characters designated like or similar parts throughout the different views, I provide a mobile body or truck which is generally designated 10. As shown, this body has a suitable chassis 11 primarily consisting of parallel side beams at 12. This chassis is mounted by standard railway trucks at 13 at front and rear whose axles 14 are equipped with the usual wheels 15 which are mounted to travel on conventional rails 16, of any desired length and shape of track, the same being mounted on customary ties 17. The mobile body or truck will have the benefit of the cushioning action of the conventional springs 18 of the truck, to withstand any impact due to the landing of an airplane or aircraft on the body.

Said body may be propelled by any suitable motor, such as an ordinary internal combustion engine, Diesel motor or otherwise, mounted on the chassis at 19 and having appropriate controls for operation by a driver seated at 20. Such motor or prime mover 19 through a controlled gear box 21 drives a shaft 21a having a gear 22 thereon, enmeshed with a gear wheel 23, keyed to one of the axles 14 in order to positively drive one set of the wheels 15. The gear box 21 provides for both forward and reverse movements.

At the front and rear, I provide suitable cradle structures C and D adapted for the landing of aircraft, a fragment of which is suggested at A in dotted lines in Figure 1. Such aircraft may either land or take off on or from the cradle structures C and D. As the under surfaces of different aircraft vary, the cradle structures C and D will often need to be disposed at different heights for the landing and taking-off of aircraft on an even keel. Accordingly, the structures C and D are adjustable relatively to each other. The adjustment also enables aircraft to land or take-off at the most desirable and advantageous positions, relatively to the ground, as dictated by their shape, size and construction.

Cradle structure C is composed, for instance, of a cradle 24 having an arcuate upper surface 25 to approximately conform to the shape of the under surface of the fuselage of the aircraft adapted to engage or land in the same. The cradle 24 is supported by and adapted to be raised and lowered by the control of a pair of hydraulic dashpots 26. These dashpots 26 have cylinders 27 supported by a mounting 28 suitably fastened to the side beams 12. Depending from the cradle 24 is a pair of rods 29 at the lower ends of which are pistons 30 operable within the cylinders 27 to complete the dashpots. Hydraulic fluid is adapted to flow into and out of the cylinders 27 through conduits 31.

Reverting to the rear cradle structure D, it has a cradle 32 shaped like that at 24, with a pair of rods 33 depending therefrom and operating in cylinders 34, the rods having pistons 35 within the cylinders. Such parts provide dashpots like those at 26 which are hydraulically operable by hydraulic fluid adapted to enter and leave through conduits or pipes 36. It will be understood that the hydraulic fluid from any suitable source and under any suitable control is applied to the dashpots of the front and rear cradle structures, the same being carried by the chassis 11 or by means independently thereof, as preferred. By reason of the dashpots, the cradles 24 and 32 may be readily raised or lowered. Said conduits 31 and 36 are preferably flexible as shown.

At the rear cradle structure D plate 37 is carried by the chassis 11, spanning the side beams 12, and mounting the same are parallel, preferably arcuate, beams 38 and 39. Said cradle 32 and its dashpots 32—35 are laterally slidable as a unit between the beams 38 and 39 on the platform 37, and to this end, castors or rollers 40 are carried by the cylinders 34 and travel on said platform 37.

A suitable bracing and bracket structure 41 connects the cylinders 34 and mounts the reversible motor 42, which may be electric or of any other type of prime mover and under appropriate control. Such bracket or mounting 41 includes a bearing 43 in which a vertical shaft 44 is journaled and retained. Fixed on the shaft 44 is a horizontal gear wheel 45 enmeshed with a pinion or gear wheel 46 carried by the main shaft of the motor 42. Shaft 44 is an idler and it also carries below the gear wheel 45 a pinion 47 enmeshed with a rack or teeth 48 provided in an upper forwardly projecting flange 49 of the beam 39. As a result of this construction, the motor 42 may be energized and controlled in order to move the cradle 32 laterally to the best position for coaction with aircraft about to land or about to take off.

It will be noted that a horizontally elongated slot 50 may be provided in the beam 39, through which the hose or conduit 36 passes to the cylinders 34.

Attention is called to the fact that while the front cradle structure C is not movable laterally, it may be constructed identically with that disclosed at D especially so that it will be capable of the same lateral movement.

It will be understood that I have shown the mobile body with railway trucks by way of example only, and that for smaller planes, instead of rails and railway trucks, I may use conventional wheels with rubber tires and for the rear wheels may use a steering device, or I may use a steering device for the front wheels.

The structure will also be equipped with a two-way radio apparatus to help with landing, and also be equipped with a speed indicator the same as aircraft so that speeds may be coordinated.

The lateral adjustment or positioning of the cradle 32 is especially desirable to facilitate engagement with the tail end of the airplane which may fishtail right or left or may be blown one way or the other by side winds.

The particular landing rig illustrated is designed for the landing or take off of the heavier passenger planes and freight planes, for instance, above thirty or forty tons. The springs of the trucks will absorb any undue shock in landing. By reason of the invention, the weight of the landing gears on the planes can be eliminated, which is highly advantageous as the weight of some of such landing equipment exceeds 2000 pounds.

The landing planes may be equipped with two studs extending out near the front of the plane to slide against the front cradle C and engage means to close an electric circuit through a red or other signal light on the instrument panel of the plane and when the plane has landed and is properly positioned, on the invention, a green light or the equivalent will show in the instrument panel.

It will be understood that in landing, the plane or aircraft at the fuselage or under surface thereof will engage the cradles 24 and 32 as suggested by the dotted lines A in Figure 1, the adjustment of the rear cradle mechanism and the front cradle mechanism, when made adjustable, greatly facilitating the engagement of the cradles with the fuselage.

Various changes may be resorted to provided they fall within the spirit and scope of the invention.

I claim as my invention:

1. A structure of the class described comprising a self-propelled body, cradle means thereon to accommodate the landing and support of aircraft, said cradle means including a plurality of cradles, and means operable to move one of the cradles laterally with respect to the other, said cradles including dashpots operable to raise and lower the same.

2. A structure of the class described comprising a self-propelled mobile body, means thereon to accommodate the landing of aircraft, said means including a cradle, beams on the body in spaced relation, supporting means for the cradle movable between the beams, means gearing said supporting means to one of the beams whereby the cradle will be moved by the gearing, and means operable to drive the gearing.

3. A structure of the class described comprising a self-propelled mobile body, means thereon to accommodate the landing of aircraft, said means including a cradle, beams on the body in spaced relation, supporting means for the cradle movable between the beams, means gearing said supporting means to one of the beams whereby the cradle will be moved by the gearing, and means operable to drive the gearing, comprising a prime mover carried by said supporting means.

4. A structure of the class described comprising a self-propelled mobile body, means thereon to accommodate the landing of aircraft, said means including a cradle, beams on the body in spaced relation, supporting means for the cradle movable between the beams, means gearing said supporting means to one of the beams whereby the cradle will be moved by the gearing, said supporting means including dashpots having cylinders, means connecting the cylinders, a prime mover mounted by said means, and means gearing said prime mover to one of the rails so that the cradle may be moved laterally of the body.

5. A structure of the class described comprising a self-propelled mobile body, means thereon to accommodate the landing of aircraft, said means including a cradle, beams on the body in spaced relation, supporting means for the cradle movable between the beams, means gearing said supporting means to one of the beams whereby the cradle will be moved by the gearing, said supporting means including dashpots having cylinders, means connecting the cylinders, a prime mover mounted by said means, and means gearing said prime mover to one of the rails so that the cradle may be moved laterally of the body, one of said beams having an elongated slot therein, and conduit means for the hydraulic control of the dashpots, passing through said slot thereto.

ANTHONY P. WIERTZ.

REFERENCES CITED

The following references are of record in the file of this patent:

UNITED STATES PATENTS

| Number | Name | Date |
|---|---|---|
| 1,272,211 | Cabot | July 9, 1918 |
| 2,197,300 | Fleet et al. | Apr. 16, 1940 |
| 2,246,716 | Bottrill | June 24, 1941 |
| 2,108,747 | Glover | Feb. 15, 1938 |

FOREIGN PATENTS

| Number | Country | Date |
|---|---|---|
| 482,057 | Great Britain | Mar. 23, 1938 |
| 523,828 | Great Britain | July 23, 1940 |